United States Patent Office 2,967,446
Patented Jan. 10, 1961

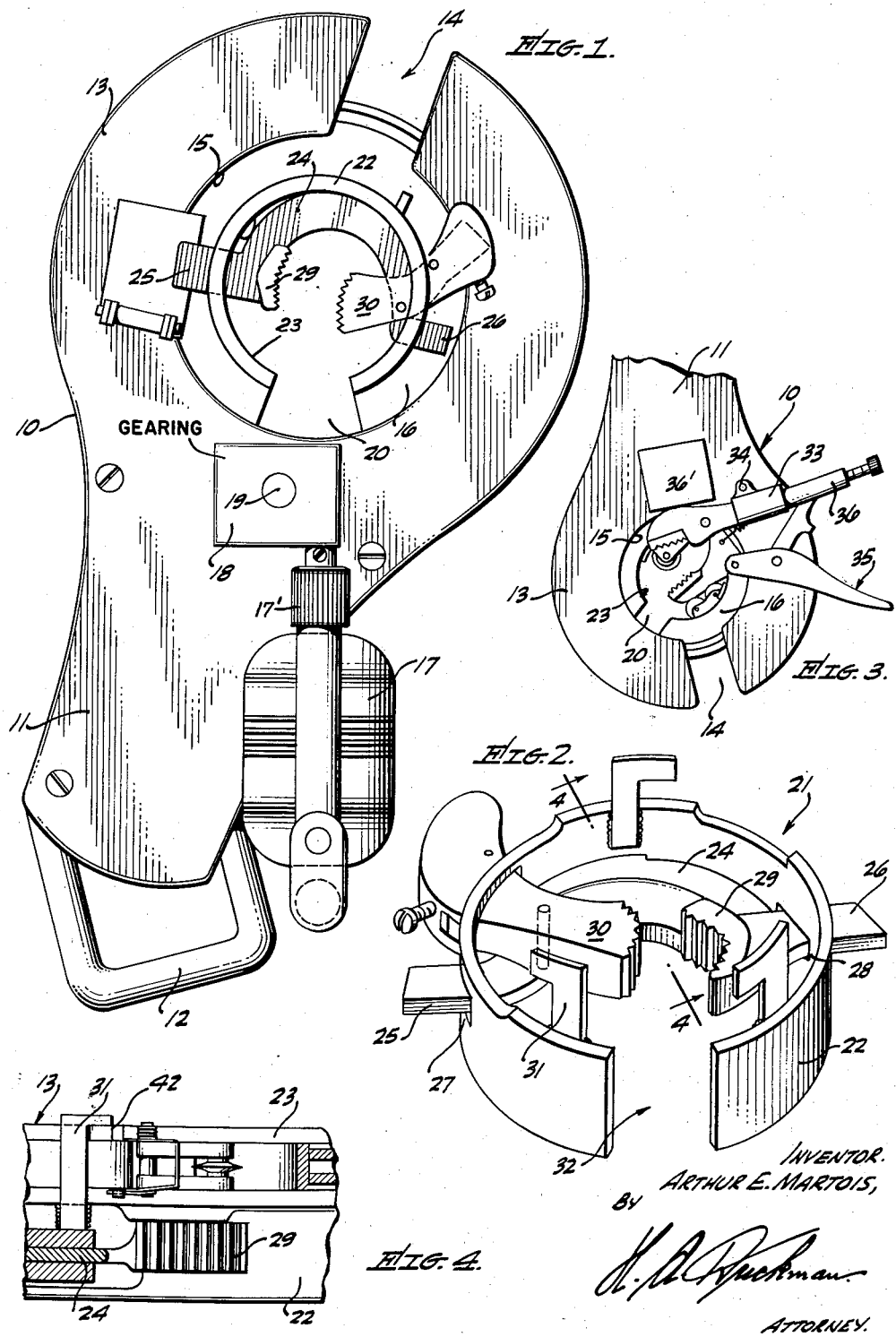

2,967,446

POWER OPERATED, PORTABLE PIPE WRENCH

Arthur E. Martois, Los Angeles, Calif.
(2279 W. 233rd St., Torrance, Calif.)

Filed July 18, 1957, Ser. No. 672,806

5 Claims. (Cl. 81—53)

This invention relates to a power operated, portable pipe wrench, and particularly to a means of holding the pipe within the chuck portion of the pipe cutter so that the pipe may be effectively gripped for the purpose of cutting, threading, or otherwise working upon the pipe. The cutting, threading, etc., of the pipe is by means of separate elements which are detachably secured to the machine.

My invention is particularly useful in connection with the portable pipe cutting machine disclosed in my Patent No. 2,769,235, issued November 6, 1956.

An object of my invention is to provide a novel pipe threading means which is used in connection with a portable pipe machine where the pipe gripping means can be effectively mounted on or removed from the pipe machine as may be necessary in the performance of the work.

Still another object of my invention is to provide a novel power actuated pipe gripping means which may be attached to the pipe machine and on one face thereof, so that the pipe may be gripped for the purpose of threading one section of pipe onto another section.

Still another object of my invention is to provide a novel pipe gripping device which can be nonrotatably mounted on the chuck of the pipe machine and still be removable when necessary.

Other objects, advantages and features of invention may appear from the accompanying drawing, the subjoined detailed description and the appended claims.

In the drawing—

Figure 1 is a top plan view of a portable pipe wrench with my improvement mounted thereon.

Figure 2 is a perspective view of the pipe gripping attachment for use on the pipe machine.

Figure 3 is a fragmentary rear view of a modified pipe wrench with the hand actuated pipe gripping tool mounted thereon.

Figure 4 is a fragmentary sectional view taken on line 4—4 of Figure 2, and also showing a fragment of the body of the machine in section.

Referring more particularly to the drawing, my pipe gripping means is particularly useful as an attachment for the pipe cutting machine disclosed in my prior Patent No. 2,769,235, issued November 6, 1956, in which the pipe cutting machine 10 consists of an elongated frame member 11 to which a handle 12 is attached or integrally formed therewith for the purpose of transporting the machine. The forward portion 13 of the machine is substantially circular in shape and is provided with a radial opening 14 which extends to the circular opening 15 in the circular portion 13 of the machine. The purpose of the slot or opening 14 is to permit pipe to be moved into the operating portion of the machine in a manner described in my previous patent. A circular chuck 16 is journaled in the circular portion 13 and is driven by the electric motor 17 through a coupling 17' to the gear box 18 which, in turn, drives the shaft 19, said shaft constituting the main driving shaft of the tool, all of which as described in my previous Patent No. 2,769,235, issued November 6, 1956. A radial opening 20 in the chuck 16 is alignable with the opening 14 to permit pipe to be inserted within the chuck 16 and to sever, thread or otherwise work upon that pipe.

In order that the pipe may be effectively held within the chuck 16 while it is being worked upon, I provide a pipe gripping member 21 which consists of a ring 22 positionable concentric with the chuck 16 and in alignment with the central opening 23 of the chuck. The pipe gripping ring 22 includes a pipe gripping mechanism as follows: An arcuate jaw carrier 24 is mounted within the ring 22 and the carrier includes two fingers 25 and 26 which extend through openings 27 and 28, respectively, in the ring 22. The jaw carrier 24 can thus be shifted radially within the ring 22 for the purpose of centering the jaws carried thereby. The carrier 24 includes a fixed jaw 29 on one side thereof and a pivoted jaw 30 on the other side thereof. The jaws 29 and 30 both have serrated or toothed faces for the purpose of gripping the pipe. The jaw 30 is eccentrically pivoted on the carrier 24 and thus will tend to bind and effectively grip the pipe which is held against the stationary jaw 29. The fingers 25 and 26 are freely shiftable through the openings 27 and 28 and, therefore, the jaws 29 and 30 can be readily centered around the pipe which is positioned centrally within the ring 22 and also within the chuck 16. The ring 22 is removably and nonrotatably held on the chuck 16 and concentric with the central opening 23 of the chuck by means of a plurality of fingers 31 which are substantially hook or L-shaped. The fingers 31 hook over appropriate inwardly projecting lugs 42 on the chuck 16, these lugs including journals for various moving parts of the pipe cutting machine. The ring 22 rests against one face of the chuck 16 and is concentric with the chuck substantially as shown. The ring 22 is provided with an opening 32 in the wall thereof which aligns with the opening 20.

On the face of the circular portion 10 of the frame member 11, and opposite the pipe gripping ring 22, I provide a sleeve 33 which is pivotally secured to the portion 10 by means of a bolt or pin 34. Hand actuated pliers 35, preferably of the toggle type, consists of an arm 36 which can be inserted in the sleeve 33 to hold the pliers in position over the central opening 23 of the chuck 16 so that a section of pipe may be gripped thereby and nonrotatably held for the purpose of threading one section of pipe onto another if this is required. When the pliers 35 are positioned within the sleeve 33 one face of the arm 36 bears against a fixed lug 36' on the pipe cutter 10 to act as a stop or abutment for the pliers so that greater force can be exerted to grip the pipe when necessary, and also to hold the pipe in proper alignment with relation to the central opening 23 of the chuck 16.

In operation, the pipe gripping ring 22 is attached to the rotatable chuck 16 by means of the fingers 31 and, consequently, rotates continuously with the chuck. The pipe is held between the jaws 29 and 30 during the time that the pipe is being worked upon, preferably while the pipe is being threaded onto another section of pipe. It is evident that different types of jaws or different means of engaging the pipe may be employed on a similar gripping ring 22 if desired. Also the pipe may be manually gripped by means of the pliers 35 if it is desired to thread sections of pipe onto each other or for other purposes.

Having described my invention, I claim:

1. In a portable pipe wrench a frame, a chuck, means rotatably mounting said chuck in the frame, drive means on the frame extending to said chuck, said frame having an opening therein extending to said chuck, said chuck having an opening therethrough alignable with the first named opening, a gripping ring, pipe engaging means mounted on the gripping ring, said gripping ring having an opening in the side thereof alignable wtih the first two named openings, and disengageable means on the gripping ring engageable wtih the chuck securing said griping ring to the chuck.

2. In a portable pipe wrench a frame, a chuck, means rotatably mounting said chuck in the frame, drive means on the frame extending to said chuck, said frame having an opening therein extending to said chuck, said chuck having an opening therethrough alignable with the first named opening, a gripping ring, pipe engaging means mounted on the gripping ring, said gripping ring having an opening in the side thereof alignable with the first two named openings, fingers extending from said gripping ring, and means on the chuck engageable by said fingers, said fingers being disengageable from said means to releasably mount the gripping ring on the chuck.

3. In a portable pipe wrench a frame, a chuck, means rotatably mounting said chuck in the frame, drive means on the frame extending to said chuck, said frame having an opening therein extending to said chuck, said chuck having an opening therethrough alignable with the first named opening, a gripping ring, pipe engaging means mounted on the gripping ring, said gripping ring having an opening in the side thereof alignable with the first two named openings, a plurality of fingers projecting from the gripping ring and extending into the chuck, said fingers being hook shaped, means on the chuck engageable by each of the fingers to releasably secure the gripping ring to the chuck.

4. In a portable pipe wrench a frame, a chuck, means rotatably mounting said chuck in the frame, drive means on the frame extending to said chuck, said frame having an opening therein extending to said chuck, said chuck having an opening therethrough alignable with the first named opening, a gripping ring, disengageable means on the gripping ring engaging the chuck to secure the gripping ring on one face of the chuck, said gripping ring having an opening in the side thereof alignable with each of the first two named openings, a carrier bar, means shiftably mounting the carrier bar in the gripping ring, and pipe engaging jaws mounted on the carrier bar, whereby a pipe may be engaged.

5. In a portable pipe wrench a frame, a chuck, means rotatably mounting said chuck in the frame, drive means on the frame extending to said chuck, said frame having an opening therein extending to said chuck, said chuck having an opening therethrough alignable with the first named opening, a gripping ring, means on the gripping ring engaging the chuck to secure the gripping ring on one face of the chuck, said gripping ring having an opening in the side thereof alignable with each of the first two named openings, a carrier bar, means shiftably mounting the carrier bar in the gripping ring, and pipe engaging jaws mounted on the carrier bar whereby a pipe may be engaged, said means on the gripping ring comprising hook shaped fingers engageable with means on the chuck securing the gripping ring to one face of the chuck.

References Cited in the file of this patent

UNITED STATES PATENTS

| | | |
|---|---|---|
| 1,727,225 | Acres | Sept. 3, 1929 |
| 1,777,084 | Heer | Sept. 30, 1930 |
| 2,481,024 | Knecht | Sept. 6, 1949 |
| 2,550,045 | De Hetre | Apr. 24, 1951 |
| 2,550,963 | Brinkley | May 1, 1951 |
| 2,618,468 | Lundeen | Nov. 18, 1952 |
| 2,650,070 | Lundeen | Aug. 25, 1953 |
| 2,703,221 | Gardner | Mar. 1, 1955 |